US010458638B1

(12) United States Patent
Tirosh

(10) Patent No.: US 10,458,638 B1
(45) Date of Patent: Oct. 29, 2019

(54) CONNECTING SYSTEM FOR LIGHTING MEMBERS

(71) Applicant: Orili Ventures LTD, Givat Brener (IL)

(72) Inventor: Udi Josef Tirosh, Givat Brener (IL)

(73) Assignee: Orili Ventures LTD, Givat Brener (IL)

( * ) Notice: Subject to any disclaimer, the term of this patent is extended or adjusted under 35 U.S.C. 154(b) by 246 days.

(21) Appl. No.: 15/466,811

(22) Filed: Mar. 22, 2017

Related U.S. Application Data

(60) Provisional application No. 62/311,878, filed on Mar. 22, 2016.

(51) Int. Cl.
| | |
|---|---|
| *F21V 23/06* | (2006.01) |
| *F21V 23/04* | (2006.01) |
| *F21V 23/00* | (2015.01) |
| *G03B 15/02* | (2006.01) |
| *H01R 13/62* | (2006.01) |
| *H01R 25/16* | (2006.01) |
| *F21Y 115/10* | (2016.01) |
| *F21Y 103/10* | (2016.01) |

(52) U.S. Cl.
CPC ............ *F21V 23/06* (2013.01); *F21V 23/003* (2013.01); *F21V 23/04* (2013.01); *G03B 15/02* (2013.01); *H01R 13/62* (2013.01); *H01R 25/162* (2013.01); *F21Y 2103/10* (2016.08); *F21Y 2115/10* (2016.08)

(58) Field of Classification Search
CPC .. F21Y 2115/10; F21Y 2103/10; F21V 23/06; F21V 23/002; H01R 25/162
See application file for complete search history.

(56) References Cited

U.S. PATENT DOCUMENTS

| | | | |
|---|---|---|---|
| 7,726,840 B2 * | 6/2010 | Pearson | F21S 2/005 362/249.01 |
| 8,801,237 B2 * | 8/2014 | Pearson | F21S 2/005 362/249.02 |

* cited by examiner

*Primary Examiner* — Robert J May
(74) *Attorney, Agent, or Firm* — Loginov & Associates, PLLC; William A. Loginov

(57) ABSTRACT

A connecting system for lighting members includes a rotary hinge assembly with an internal electrical connection, an upper hinge portion, a lower hinge portion, a central axial bolt that resides within an axial channel in the upper hinge portion and the lower hinge portion; and at least one LED strip assembly with a translucent LED module cover, a LED module of at least one LED in an array, a strip frame and at least one end cap with a female electrical connection port. A method for assembling a connecting system for lighting members includes connecting a first LED strip assembly with a rotary hinge; connecting a second LED strip assembly with the rotary hinge; placing a mount on one of the LED frames and engaging the mount with a support device; and inserting a power cord into a power connection port and connecting the power cord to a power source.

14 Claims, 22 Drawing Sheets

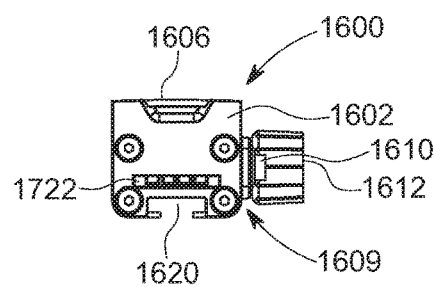
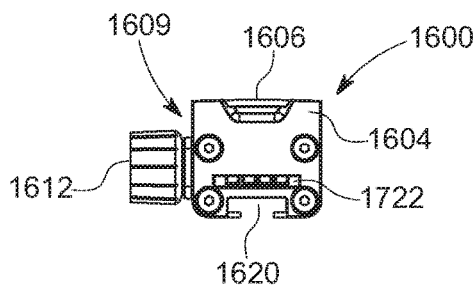
FIG. 16D  FIG. 16E
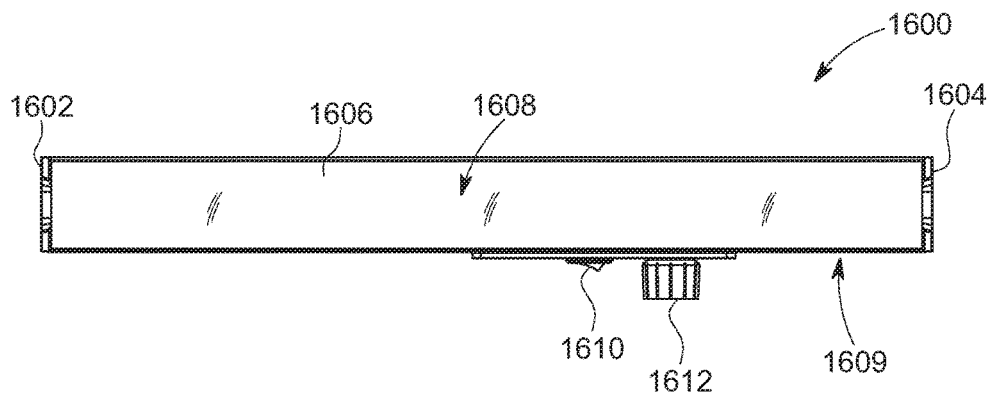
FIG. 16F
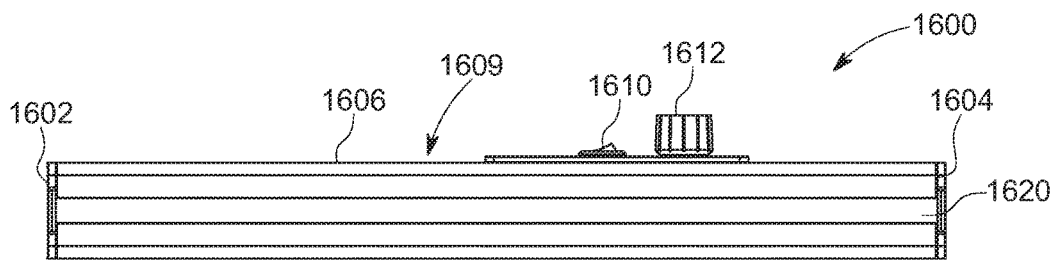
FIG. 16G

CONNECTING SYSTEM FOR LIGHTING MEMBERS

RELATED APPLICATIONS

This application claims the benefit of U.S. Provisional Application Ser. No. 62/311,878, filed Mar. 22, 2016, entitled CONNECTING SYSTEM FOR LIGHTING MEMBERS, the entire disclosure of which is herein incorporated by reference.

FIELD OF THE INVENTION

This invention is in the field of photography, and more particularly, illumination for photographers that utilizes Light Emitting Diode lighting strips.

BACKGROUND OF THE INVENTION

Illumination for photography is produced by various devices and lighting sources. Varying the location of the illumination source, as well as the orientation, intensity and type of light will create different effects for the photography and allows for greater artistic expression in the creation of an image. Typically, illumination sources are bulky to transport and carry to a photography location. Illumination sources can be fragile and susceptible to damage, in particular, florescent bulbs, incandescent and flash tubes. Lighting sources can be spotlights, bare bulbs, ring lights, long bar lights and other devices. Advances in the field of Light Emitting Diodes ("LEDs") have reduced the weight of illumination sources and provided more energy efficient delivery of light by utilizing arrays of LEDs ("LED arrays"). But the versatility of illumination sources is still limited by the relatively inflexible nature of lighting devices. Ring lights remain oriented in a ring, while LED strip assemblies remain in a strip.

It would be desirable to provide an illumination source that could transition in its geometry from a simple strip, to a longer strip or a "vee" to a polygonal shape (such as a square, hexagon or octagon) or a star with attachabilty/interconnectivity to other such units for variable size that is readily disassembled and transported in a compact manner. It would be further desirable to provide an illumination source with greater flexibility, versatility and durability, while providing a stable and rigid configuration.

SUMMARY OF THE INVENTION

A connecting system for lighting members includes at least one of a rotary hinge assembly that includes an internal electrical connection, an upper hinge portion that includes a receptacle for receiving an engaged end cap of a LED strip assembly with a male electrical connection port for connecting with a female connection port on the LED strip assembly, a lower hinge portion that includes a receptacle for receiving an engaged end cap of a LED strip assembly with a male electrical connection port for connecting with a female connection port on the LED strip assembly, a central axial bolt with a locking knob that resides within an axial channel in the upper hinge portion and the lower hinge portion; and at least one of a LED strip assembly that includes a translucent LED module cover, a LED module that includes at least one LED in an array, internal electrical conduits, at least one power connection and a power control circuit/chip, a LED strip frame and at least one end cap with a female electrical connection port.

The rotary hinge assembly is engaged with two LED strip assemblies with one engaged with the receptacle of the upper hinge portion and one engaged with the receptacle of the lower hinge assembly so as to form a two element lighting array with a variable shape. Four rotary strips and four LED strip assemblies can be engaged with one another such that a first LED strip assembly is engaged at one end with a first rotary hinge assembly that is engaged at one end with a second LED strip assembly that is further engaged at one end with a second rotary hinge assembly that is further engaged at one end to a third LED strip assembly that is further engaged at one end with a third rotary hinge assembly that is further engaged at one end with a fourth LED strip assembly, thereby forming a lighting array wherein the first LED strip assembly is in proximity to the second LED strip assembly that is in turn in proximity to the third LED strip assembly that is in turn in proximity with the fourth LED strip assembly. Four rotary strips and four LED strip assemblies are engaged with one another such that a first LED strip assembly is engaged at one end with a first rotary hinge assembly that is engaged with a second LED strip assembly that is further engaged at one end with a second rotary hinge assembly that is further connected to a third LED strip assembly that is further engaged at one end with a third rotary hinge assembly that is further engaged at one end with a fourth LED strip assembly that is further engaged at one end with the fourth rotary hinge that is in turn further engaged at one end with the first LED strip assembly, thereby forming a lighting array that is rectilinear in shape. A connecting member with receptacles for engaging up to eight discrete LED strip assemblies at an end, all radially arranged around a central *nexus* so as to form a star. A carrying case for retaining, storage of and transporting a connecting system for lighting members in a disassembled state is comprised of an openable rigid exterior shell case with an upper portion that includes a removable piece of high density foam material for padding, a lower portion that includes a removable piece of high density foam with a plurality of cutout compartments for holding each of a component of a disassembled connecting system for lighting members, a hinge assembly, a handle and a latch device for closure of the carrying case. A method for assembling a connecting system for lighting members includes the steps of connecting a first LED strip assembly at one end with a first rotary hinge; connecting a second LED strip assembly at one end with the first rotary hinge; placing a mount on a LED frame of one of the LED strip assemblies and engaging the mount with a support device; and inserting a power cord into a power connection port along one of the first LED strip assembly or the second LED strip assembly and connecting the power cord to a power source. In another embodiment, a sequence of lighting members includes a master lighting member that includes an on/off switch and a dimmer that are connector to a circuit board chip. The dimmer controls the intensity of illumination for the master lighting member and all connected lighting members. The electrical connections can be USB-type connectors.

BRIEF DESCRIPTION OF THE DRAWINGS

The invention description below refers to the accompanying drawings, of which:

FIG. 16D is a left side view of the master member of a connecting system for lighting members, according to the fifth embodiment;

FIG. 16E is a right side view of the master member of a connecting system for lighting members, according to the fifth embodiment;

FIG. 16F is a top view of the master member of a connecting system for lighting members, according to the fifth embodiment;

FIG. 16G is a bottom view of the master member of a connecting system for lighting members, according to the fifth embodiment;

DETAILED DESCRIPTION

Figure 1:
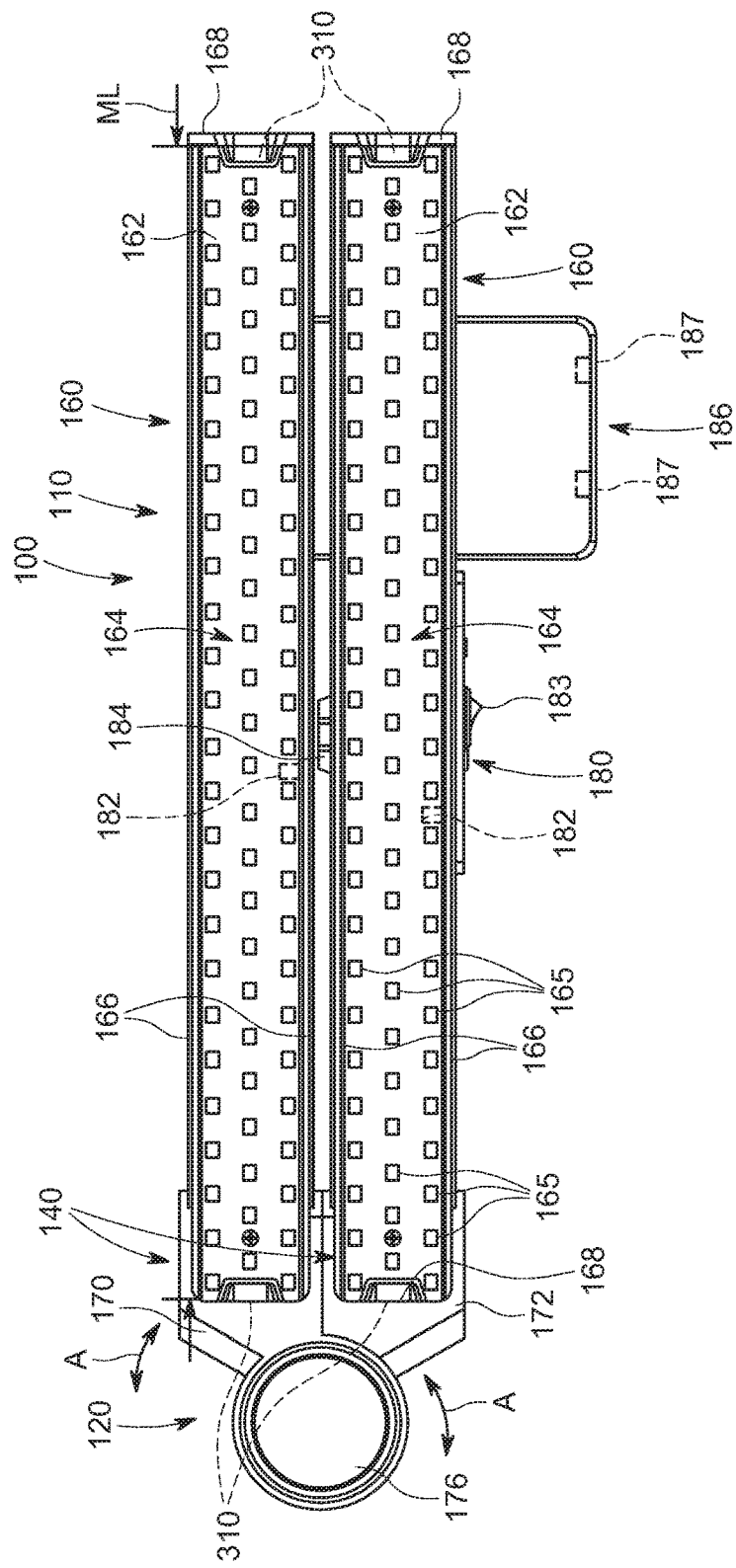
FIG. 1 is is a frontal view of an illustrative member of a connecting system for lighting members, according to a first embodiment.

A connecting system 100 for a LED strip assembly can include at least one rotary hinge assembly 120 and at least one LED strip assembly 160 as illustratively shown in FIG. 1, according to an illustrative embodiment. A rotary hinge assembly 120 can include an internal electrical connection (not shown, but set forth more fully below), an upper hinge portion 170 with a receptacle 140 with an electrical connection for a LED strip assembly 160, a lower hinge portion 172 with a receptacle 140 with an electrical connection for a LED strip assembly 160, locking knobs 236, 238 (not shown, but described more fully below). Receptacle 140 is sized for receiving and retaining an engaged end cap of a LED strip assembly and can include a male electrical connection port for connecting with a female connection port on the LED strip assembly. The upper hinge portion 170 can move in a rotary motion through an angle A of, for example, 270 degrees relative to the lower hinge portion 172, and the lower hinge portion 172 can likewise move in a rotary motion through an angle A of, for example, 270 degrees relative to the upper hinge portion 170. The rotary hinge is lockable and can be locked in place with the engaged LED strip assemblies 160 at a desired angle (for example, at a right angle relative to each other) by operation of a locking knob 236 and the engagement of an array of locking teeth 234 (not shown herein, but described more fully below). The central axial bolt with a locking knob can reside within an axial channel in the upper hinge portion and the lower hinge portion and function as a moveable rotating axis of the hinge (not shown herein, but described more fully below) and can be covered by a hinge cover 176.

A LED strip assembly 160 can be comprised of a translucent LED module cover 162, a LED module 164 in a LED strip frame 166 and at least one end cap 168 that can include a female electrical connection port. Each LED strip assembly can have a power connection 310 at either end, and a power connection 182 located along a side of the strip assembly, at the midpoint. A LED module 164 can be an array of more than one LED 165. In an illustrative embodiment, a LED module is constructed and arranged with 77 LEDs 165. In other embodiments, a LED module can have more or less, with a corresponding increase in weight and length. In an embodiment, a 77-LED module has an overall length ML of, for example, approximately 284 mm (11.18 inches).

An illustrative lighting array 110 can be constructed with one rotary hinge assembly 120 that can be engaged with two LED strip assemblies 160, one of which is engaged with the receptacle of the upper hinge portion and the other of which is engaged with the receptacle of the lower hinge assembly so as to form a two element lighting array with a variable shape. A mount 184 can be attached to the back side of a LED strip frame 166 and can provide a mounting interface with a stand, strip mount, wall or other mounting structure. An accessory box 186 can likewise be connected to at least one of the LED strip frame 166. The accessory box 186 can be constructed with at least one accessory connection port 187 (two connection ports 187 in the illustrative embodiment) for interface and connection with accessories (for example, a strobe light). The connection ports can provide electrical power and control connections for the connected accessory(-ies). A switch plate assembly 180 can include a power connection port 182 and an on/off power switch 183. It is expressly contemplated that each of the LED strip assemblies 160 in a lighting assembly 110 can be provided with its own discrete switch plate assembly 180 with the corresponding components.

The power connection port 182 can be an alternate connection point for the power source that can provide electrical power to the lighting assembly. The on/off power switch 183 can be arranged to turn on or off a single LED strip assembly 160 or to turn on or off power for the entire lighting assembly. LED power connections 310 are interfaces for transferring power from a hinge assembly 120 to a LED strip assembly 160, and for transfer of power from a LED strip assembly 160 that is interfaced with a power source to a connected hinge assembly 120 to one or more subsequent engaged LED strip assemblies 160 and hinge assemblies 120. As used herein the directional terms, such as, but not limited to, "up" and "down", "upward" and "downward", "rear", "rearward" and "forward", "top" and "bottom", "inside" and "outer", "front" and "back", "inner" and "outer", "interior" and "exterior", "downward" and "upward", "horizontal" and "vertical" should be taken as relative conventions only, rather than absolute indications of orientation or direction with respect to a direction of the force of gravity. A method for assembling a connecting system for lighting members can include the steps of connecting a first LED strip assembly at one end with a first rotary hinge; connecting a second LED strip assembly at one end with the first rotary hinge; placing a mount on a LED frame of one of the LED strip assemblies and engaging the mount with a support device; and inserting a power cord into a power connection port along one of the first LED strip assembly or the second LED strip assembly and connecting the power cord to a power source.

Figure 2:
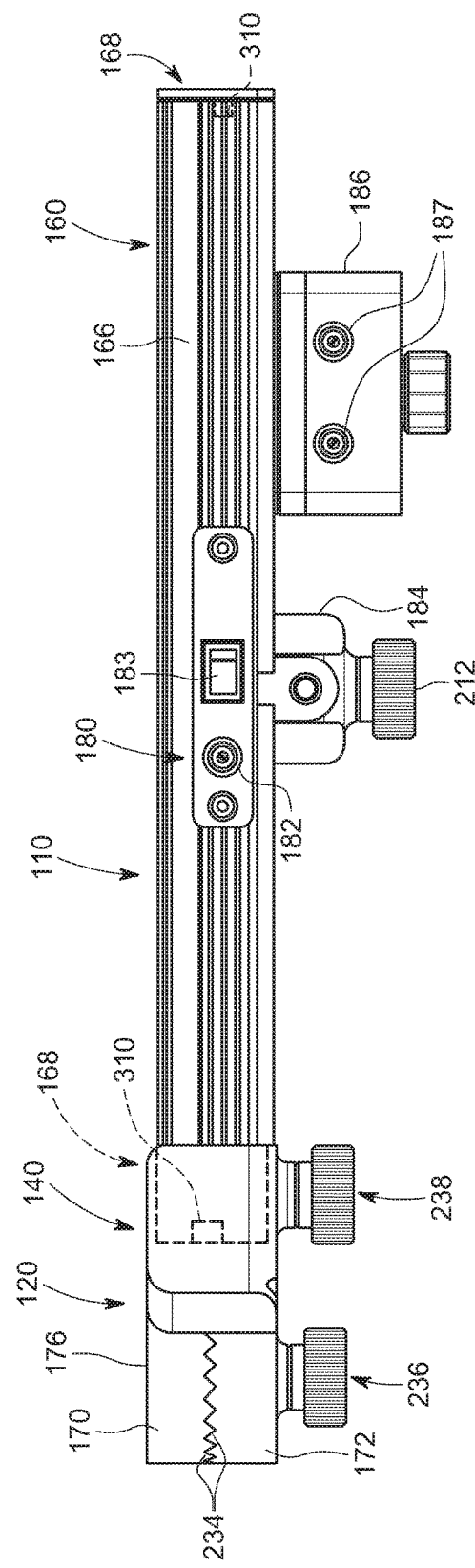
FIG. 2 is a side view of the illustrative member of a connecting system for lighting members, according to a first embodiment.

FIG. 2 is a side view of the illustrative lighting assembly 110 of FIG. 1, showing the components of the switch plate assembly 180 in greater detail. Power connection port 182 and the accessory connection ports 187 are shown in exemplary places. It is contemplated that power connection port 182 can be situated at any place along the surface of the switch plate assembly 180, on one side of the strip or the other, or on both sides. Similarly, the accessory connection ports 187 can be located at any point along the surface of the accessory box 186, or optionally, on the bottom. The accessory box 186 can be provided with a power connection with the LED strip assembly 160, either by an interface of male and female connectors, by wires and/or cable connections.

Locking knob 236 can include a threaded bolt that locks the hinge in a particular orientation and that orientation can be further secured by the engagement of locking teeth 234 that are attached to the upper hinge portion 170 and to the lower hinge portion 172. The upper hinge portion is provided with teeth and the lower hinge portion is provided with teeth so that the teeth of the upper hinge portion can removably engage the teeth of the lower hinge portion and thereby create a strong, precisely aligned connection between the upper hinge portion and the lower hinge portion. Locking knobs 238 can each include a threaded bolt that lock the LED strip assembly 160 in a receptacle 140, thereby securing the physical and electrical connections between the hinge assembly 120 and the LED strip assembly 160. Locking knob 212 can include a threaded bolt that locks mount 184 to the bottom of the LED frame 166.

Figure 3:
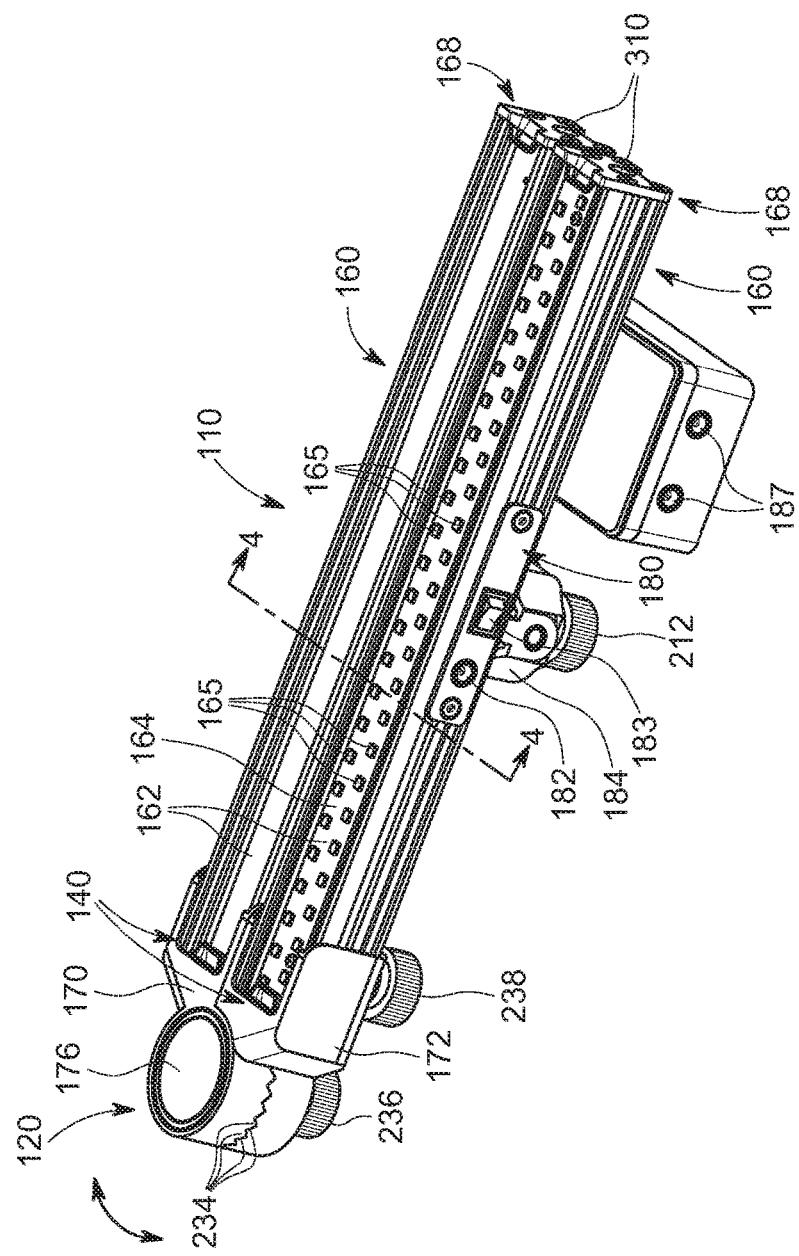
FIG. 3 is a perspective view of the illustrative member of a connecting system for lighting members, according to a first embodiment.

FIG. 3 shows exemplary positions of the LED power connections 310 in their corresponding end caps 168 of each LED strip assembly 160. As noted above the orientation of each of the LED strip assemblies 160 relative to each other, side by side, as shown, in a "vee" formation, at right angles to each other, or in a 180 degree orientation such that the LED strip assemblies 160 form an elongated structure with a LED strip assembly at each end of an opened hinge assembly 120, that can be locked in place by a tightened locking knob 236 and the interface of the teeth 234 of the engaged upper hinge portion 170 with the lower hinge portion 174. To change that orientation, the user can untighten knob 236 by a rotary motion until the engaged teeth 234 are free of each other. The LED strip assemblies 160 can then be re-oriented. When the LED strip assemblies 160 are in the desired orientation, the user can tighten the knob 236 until teeth 234 fully engage with each other and the lighting assembly 110 is in its new orientation.

Figure 4:
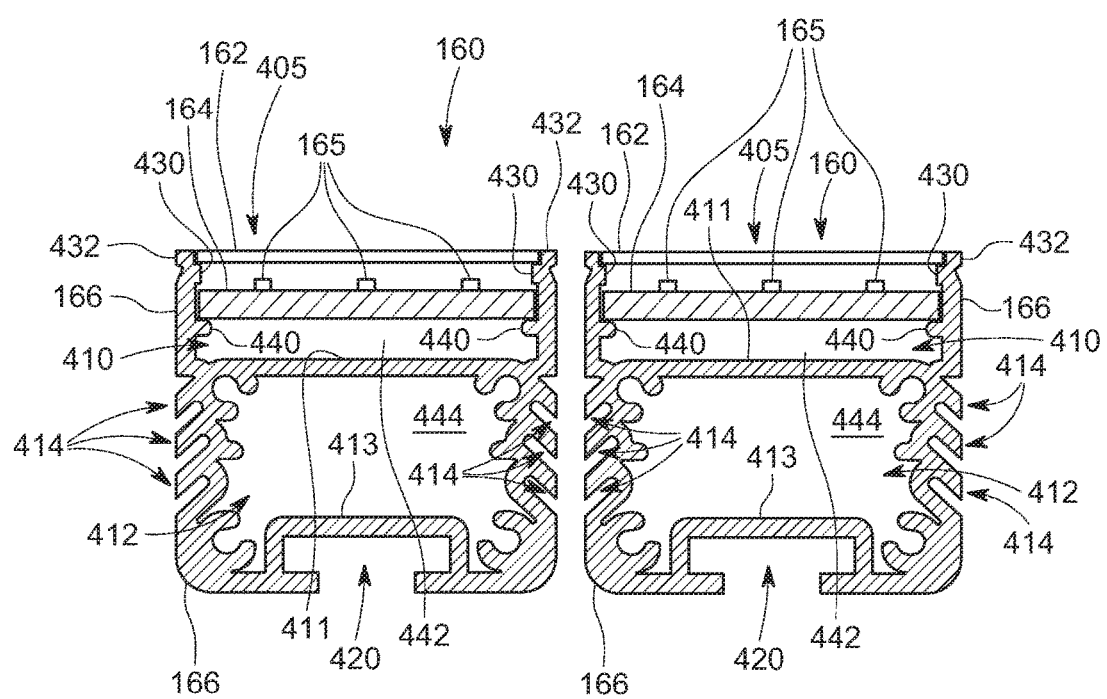
FIG. 4 is a cross-sectional view of the illustrative member of a connecting system for lighting members along line 4-4 of FIG. 3, according to the first embodiment.

FIG. 4 is a cross section along lines 4-4 of FIG. 3 and shows the internal arrangement of the LED strip assemblies 160. The LED frame 166 is the main structural member of each LED lighting strip assembly 160 and can be formed of a lightweight metal (for example, extruded aluminum) or other lightweight material. The LED frame 166 can be constructed with a top opening 405 in the upper portion 410. A co-formed floor 411 of the upper portion can connect the linear sides of the LED frame 166 and extend from one end to the other. A lower portion 412 can be beneath the upper portion floor 411 and includes the lower portion floor 413. The exterior linear walls can be provided with a plurality of at least one radiating fin 414 that extends from one end of the LED frame to the other. In an embodiment, a LED frame 166 is provided with three radiating fins 414 on each sidewall 432. A bottom channel 420 can provide an attachment point for mount 184, accessory box 186, or other devices that can be attached (for example, a flange attached to a vehicle body). A transparent cover 162 can be attached to the LED frame 166 and reside between opposing shoulders 430 on each sidewall 432. The cover can be held in place by a snap-fit or an adhesive. LED modules 164 can reside on top of shoulder 440 that are con-formed with the sidewalls 432 of the LED frame. The LED modules 164 can be held in place with a snap-fit between the sidewalls 432 or an adhesive. Air spaces 442 and 444 can be divided by floor 411 and collect heat from the LED module 164 when in use, transferring accumulated heat from material of the LED frame 164 that is then radiated away by operation of the radiating fin(s) 414. For more powerful or larger LED modules, it is expressly contemplated that each frame can be provided with more radiating fins than shown in the illustrative embodiment.

Figure 5:
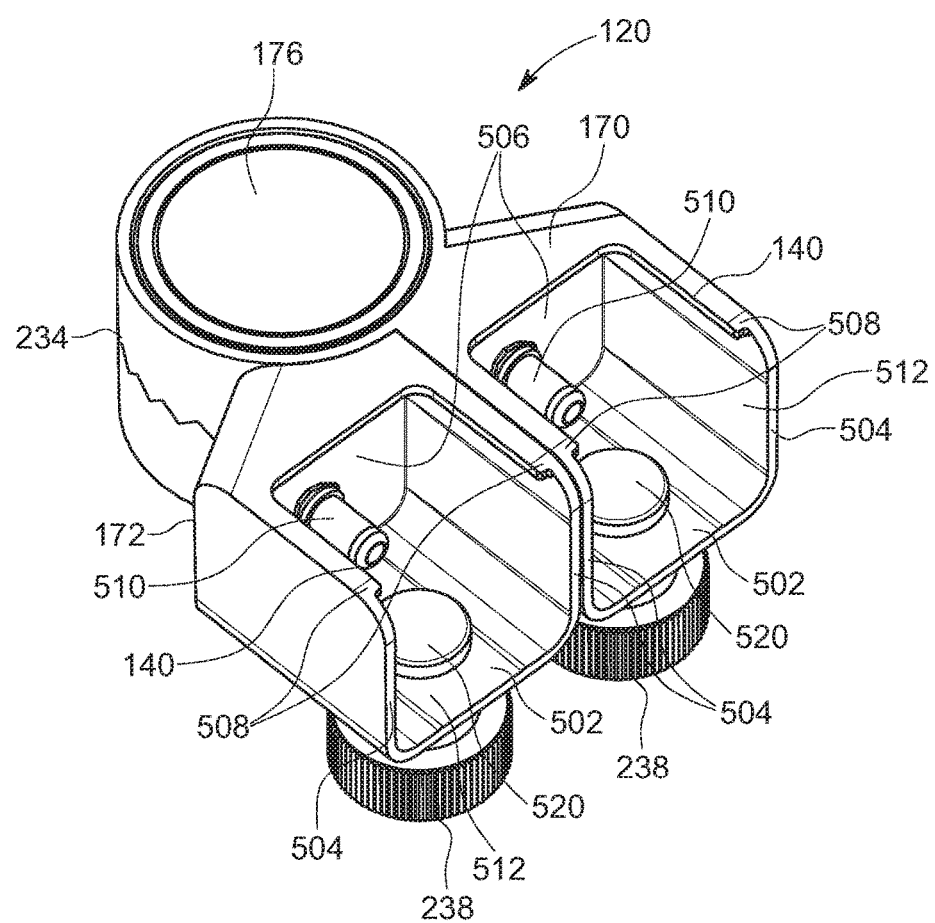
FIG. 5 is a perspective view of a rotary hinge assembly of a connecting system for lighting members, according to the first embodiment.

With reference to FIG. 5, each of the upper hinge portion 170 and lower hinge portion 172 can be provided with a receptacle 140. The receptacle can be sized and proportioned to receive an end of a LED strip assembly (not shown). Each receptacle 140 can be constructed with a floor 502, a pair of counter-posed sidewalls 504 and a rear wall 506. The top surfaces of each side wall 504 can be provided with an inner lip 508 that helps to capture and retain the LED strip assembly 160 when inserted into the receptacle. A power connection member 510 can be situated on the rear wall 506 of each receptacle and defines a "male" connector that can engage with the corresponding "female" LED power connection 310 on the LED strip assembly 160. The floor 502, sidewalls 504 and rear wall 506 define an inner volume 512 of the receptacle that can be open at the front (the front being the region of the receptacle that is farthest away from the rear wall) and along the top portion. A threaded bolt 520 of the locking knob 238 can enter the inner volume 512 through the floor 502 and can engage with the bottom channel 420 of LED strip assembly. As the locking bolt 238 is tightened or loosened, the threaded bolt 520 will move upwards or downwards relative to the floor 502. To lock a LED strip assembly into a receptacle, a user can place one end of the LED strip assembly into the inner volume 512 and push the end of the LED strip assembly along the inner volume until coming in contact with the power connection 510, until the end of the LED strip assembly is making contact with or about to make contact with the rear wall 506. The "male" power connection member 510 can enter the "female" power connection 310 until they are fully engaged. At this point, the user can tighten the locking knob until the threaded bolt 520 enters the mounting channel and maintains the connection between LED strip assembly and hinge assembly until released by turning the locking knob 236 to loosen the bolt and withdraw the bolt from the mounting channel. In alternate embodiments, the "male" power connection can be on the LED strip assembly 160 and the "female" power connection can be part of the hinge assembly 120, or the two power connections can be strips of metal on the interior of the hinge assembly and exterior of the LED strip assembly that make contact with each other when the LED strip assembly 160 is engaged within the hinge assembly 120, or other types of power connectors that would be apparent to one skilled in the art.

Figure 6:
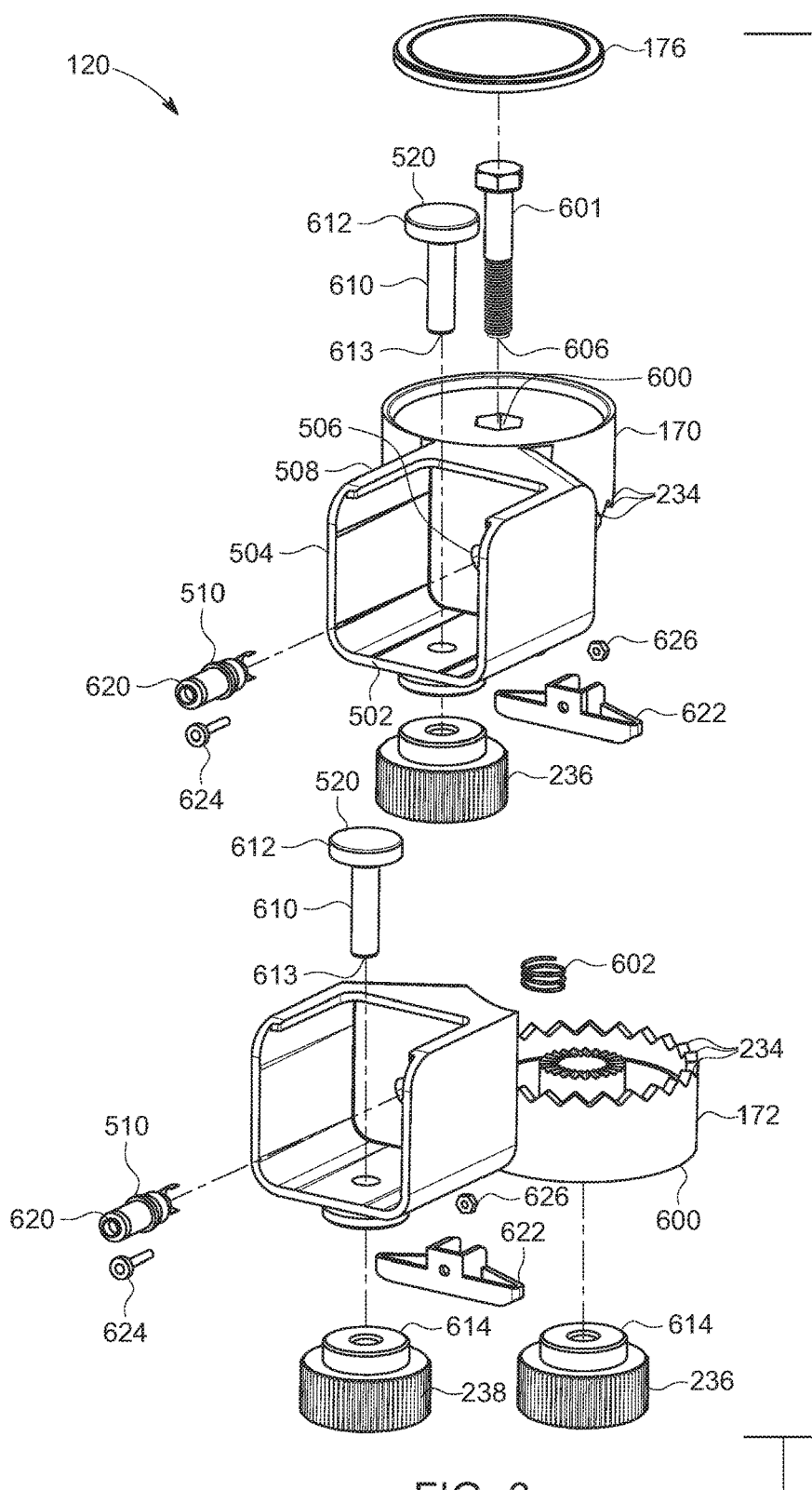
FIG. 6 is an exploded view of the rotary hinge assembly of a connecting system for lighting members, according to the first embodiment.

FIG. 6 is an exploded view showing the sub-components of the hinge assembly 120. An axial channel 600 can be formed by through-holes in the center of the upper hinge portion 170 and lower hinge portion 172 and receives the center axial bolt 601 that can be secured in place by retaining knob 602. Locking knob 236 can engage a lower end 606 of the center axial bolt 601. With respect to the locking knob 238 and the threaded bolt 520, each bolt can be constructed with a relatively narrow threaded shaft and a mushroom-shaped top 612. The threaded bottom 613 of each shaft 610 can engage with the locking knob 238 at a center well 614. The power connections 510 can be comprised of connectors 620 with connector prongs, a support mount 622 that can be secured to the rear wall of the receptacle by a locking bolt 624 and a locking knob 626.

Figure 7:
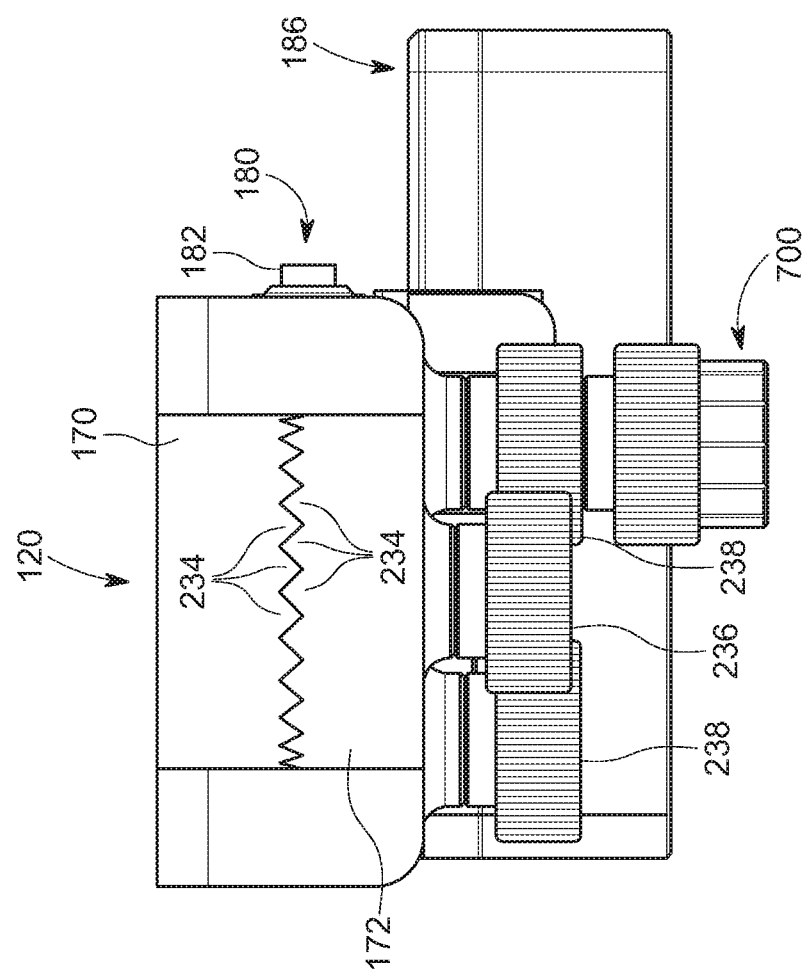
FIG. 7 is an end view of the rotary hinge assembly of a connecting system for lighting members, according to the first embodiment.

FIG. 7 is an end-on view of the hinge assembly, showing the relative locations of the locking knobs 236, 238 with regard to the rest of the components.

Figure 8:
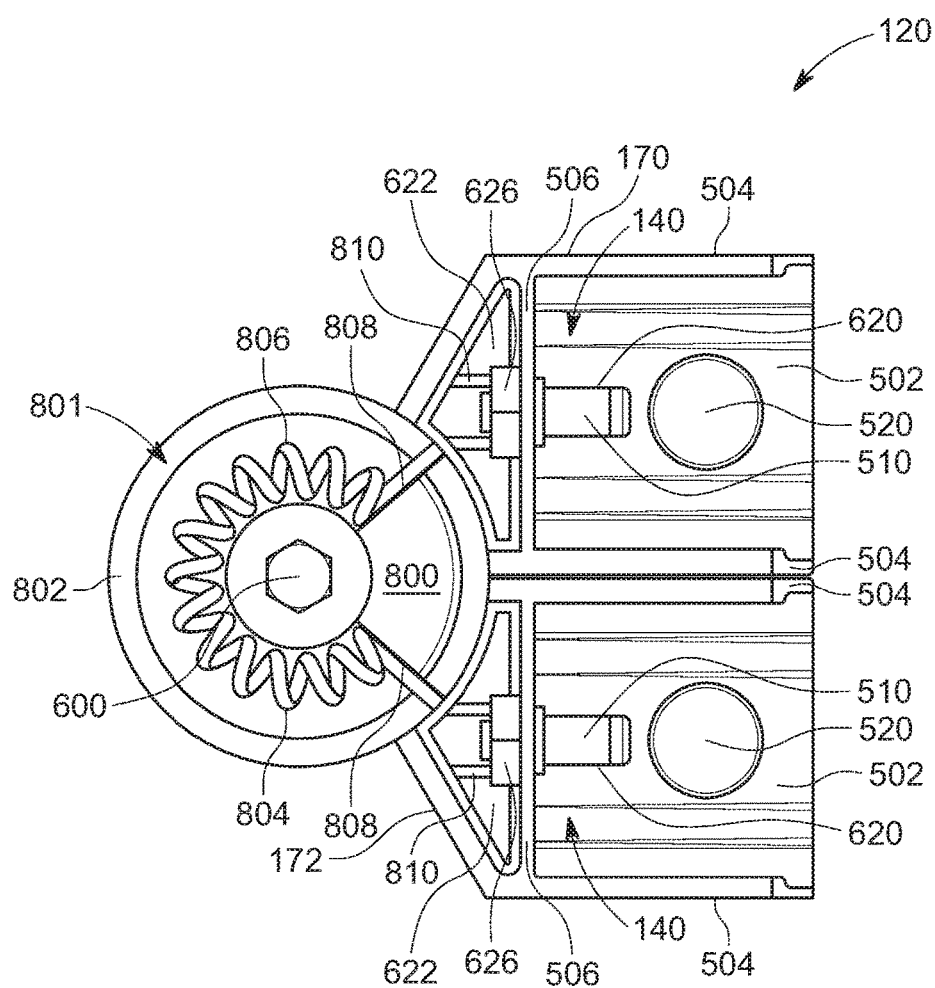
FIG. 8 is top view of the interior of the rotary hinge assembly of a connecting system for lighting members, according to the first embodiment.

FIG. 8 is a top partial cut away view of the hinge assembly without the hinge cover and exposing the wiring harness within the hinge assembly 120. A circular hinge channel 800 can be arranged within the hinge body 801 and can be defined as an inner volume between a circumferential outer hinge wall 802 and an inner wall 804 that surrounds the axial channel 600. In the illustrative embodiment, a coiled wire 806 can be located within the hinge channel 800. The coiled wire can expand and contract as the hinge is rotated to a desired orientation. The coiled wire can include connection ends 808 that can engage with connector prongs 810 of the respective connector 620 to form each power connection member 510. In another embodiment, the wire is replaced by concentric connections that function as a slip ring type power connector.

Figure 9:
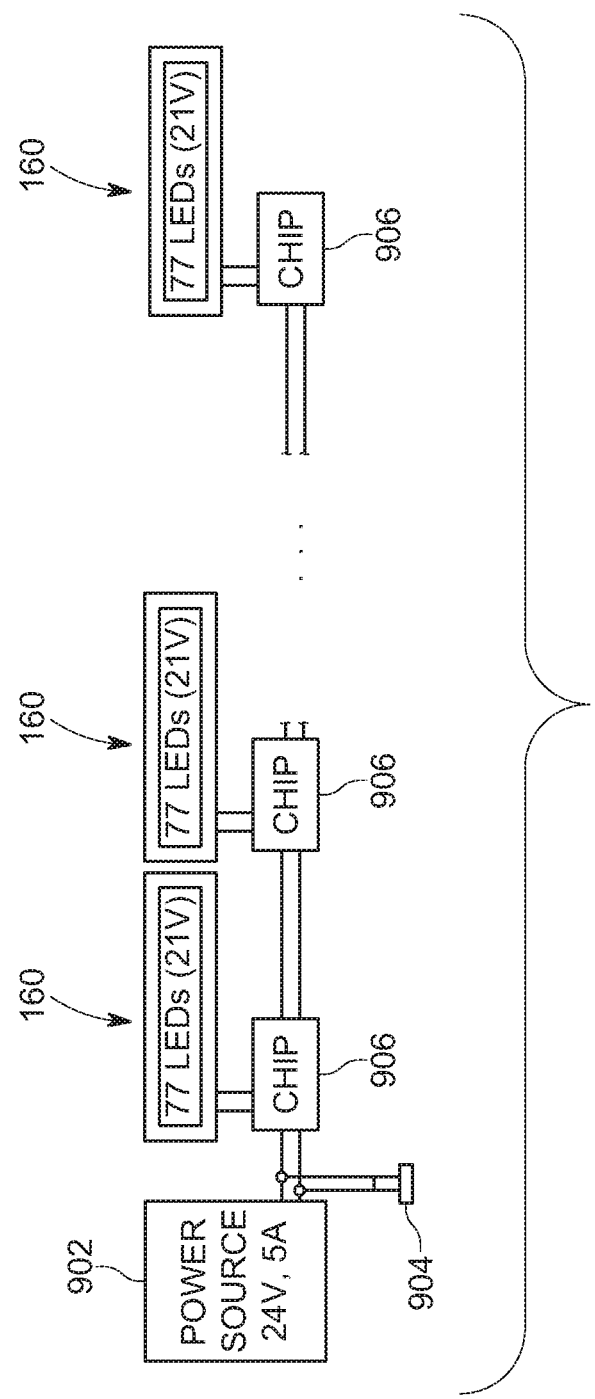
FIG. 9 is a schematic electronics plan for a connecting system for lighting members.

FIG. 9 is a schematic plan of lighting members 160 arranged in an array. A power source 902 provides power. This power can be 24 volt and can be provided by a plug-in adapter that draws from a local outlet or from an assembly of power storage batteries. The power can travel along wire connections to a LED strip control chip 906 that can be pre-programmed to control each LED strip assembly 160. The lighting members, as described above, can be arrays of 77 LEDs each in the illustrative embodiment. A dimmer switch 904 can be located at a point along the wires to provide a control that can vary (e.g., increase or decrease) the strength of the illumination as desired. It is contemplated that the array can be comprised of one or more lighting members 160.

Figure 10:
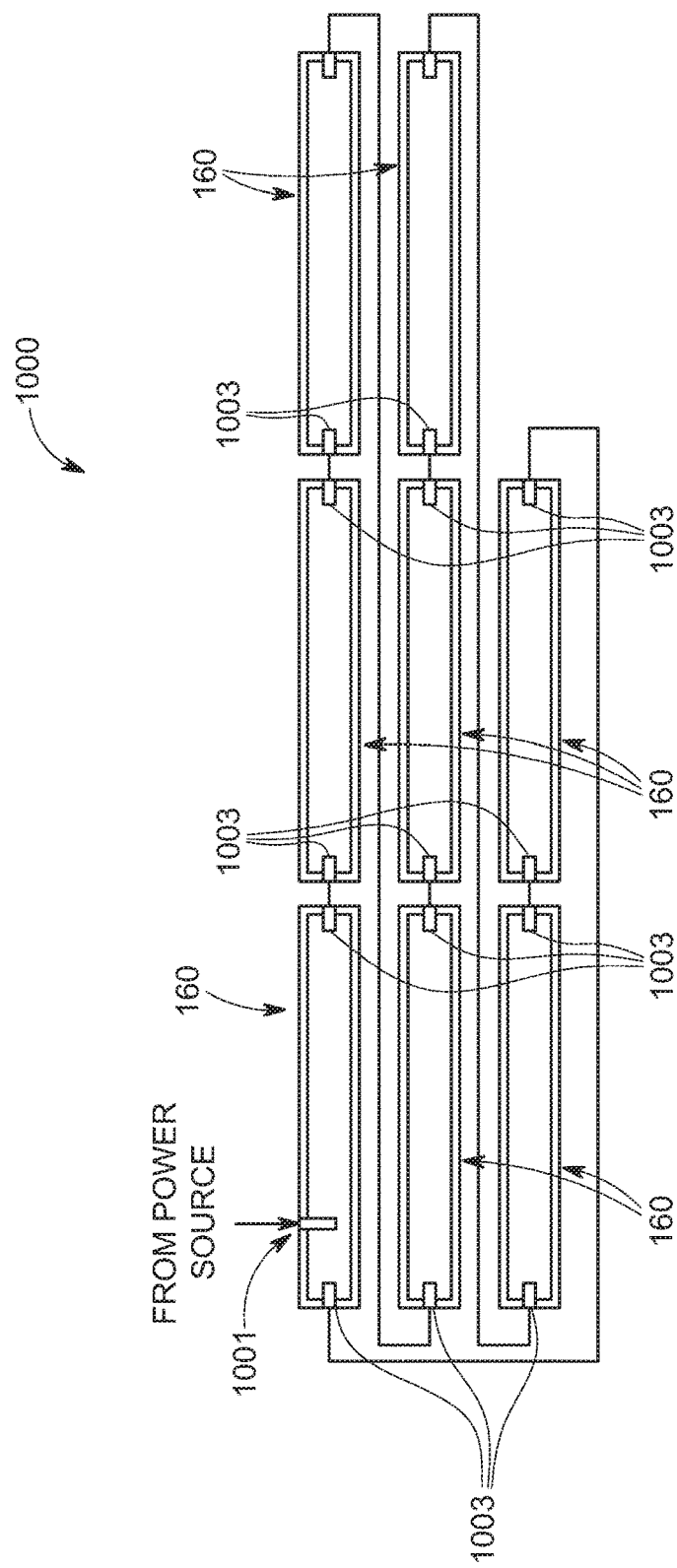
FIG. 10 is a schematic electronics plan for a connecting system for a plurality of lighting members.

FIG. 10 depicts an array of lighting members 160 wherein eight lighting members are concatenated. This concatenation can be achieved by joining lighting members 160 to rotary hinge assemblies as set forth in FIGS. 11 and 12, below, or by use of a connecting member, as set forth more fully below in FIGS. 13 and 14. Power can be supplied via a power port 1001 that can be connected to a plug-in adapter that draws from a local outlet or an assembly of power storage batteries. Each of the lighting members 160 can be constructed with a power port 1003 at each end of the strip that can be connected to a corresponding power port on an adjoining lighting member, via one or more of the rotary hinges (not shown). Each strip in sequence can provide the next with power.

Figure 11:
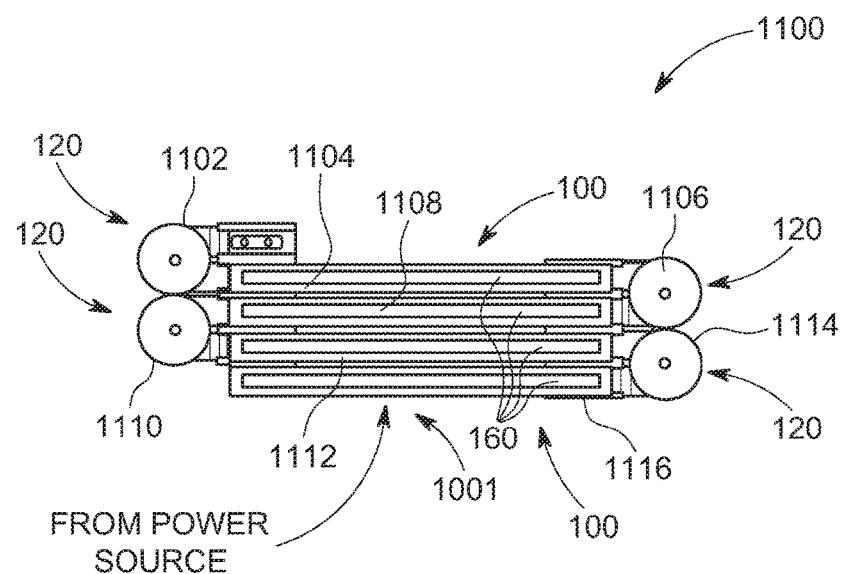
FIG. 11 is a view of a connecting system for a plurality of lighting members, according to a second embodiment.

FIG. 11 depicts an exemplary lighting assembly 1100 that is disposed as a wide strip of four parallel LED strip assemblies 160. This assembly provides for a wide lighting effect with a short length. Power can be supplied via a power port 1001. The elements can be engaged with one another such that a first LED strip assembly 160 is engaged at one end with a first rotary hinge assembly 120 that is engaged at one end with a second LED strip assembly that is further engaged at one end with a second rotary hinge assembly that is further connected to a third LED strip assembly that is further engaged at one end with a third rotary hinge assembly that is further engaged at one end with a fourth LED strip assembly, thereby forming a lighting array wherein the first LED strip assembly is in proximity to the second LED strip assembly that is in turn in proximity to the third LED strip assembly that is in turn in proximity with the fourth LED strip assembly.

Figure 12:
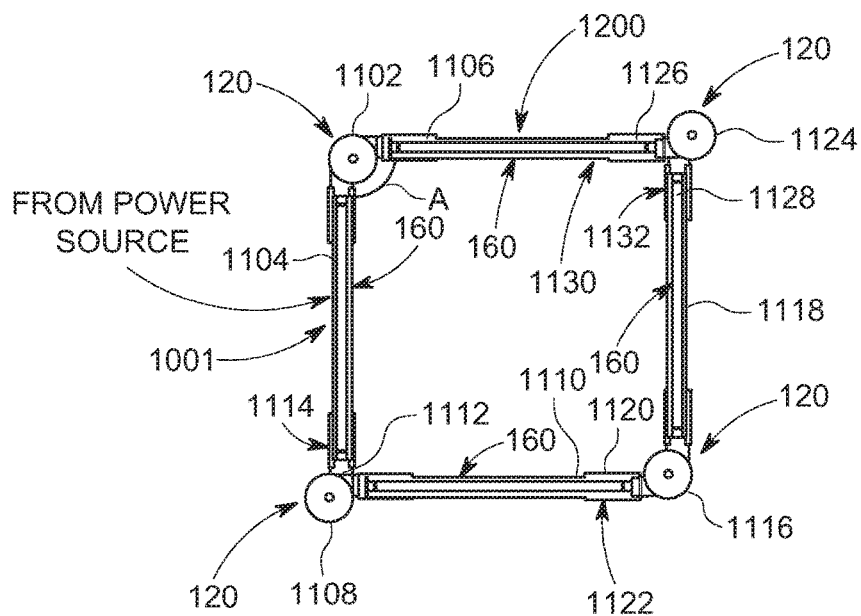
FIG. 12 is a view of a connecting system for a plurality of lighting members, according to a third embodiment.

FIG. 12 shows a lighting assembly 1200 that is disposed in a square shaped array. The exemplary assembly can be mounted onto a stand or suspended from a frame or tracks by attaching a mounting device to the assembly 1200. Lighting assembly 1200 is comprised of four hinge assemblies 120 and four LED strip assemblies 160. It is contemplated that an accessory box, as described above, can be attached to one or more of the LED strip assemblies. A method for constructing such an assembly can consist of opening a first hinge assembly 1102 with an engaged first LED strip assembly 1104 and an engaged second LED strip assembly 1106 such that an angle A drawn between LED strip assemblies 1104, 1106 is a right angle (90 degrees). A second hinge assembly 1108 with an engaged third LED strip assembly 1110 and an open (e.g., empty) receptacle 1112 can be engaged with the distal end 1114 of the first LED strip assembly 1104 and the hinge assembly can be open to form another right angle. A third hinge assembly 1116 with an engaged fourth LED strip assembly 1118 and an open receptacle 1120 can be engaged with the distal end 1122 of the third LED strip assembly 1110 and the hinge assembly can be open to form another right angle. A fourth hinge assembly 1124 with two open receptacles 1126, 1128 can now be attached by engaging the open receptacle 1126 with the distal end 1130 of the second LED strip assembly 1106 and engaging the open receptacle 1128 with the distal end 1132 of the fourth LED strip assembly 1118 to create a lighting array that is rectilinear in shape. A power cable can be attached to a power receptacle on one of the power strips 160. Each hinge assembly can provide electrical power to the attached LED strip assemblies, and each subsequent hinge assembly can then pass that current along to subsequent attached LED strip assemblies and hinge assemblies.

Figure 13:
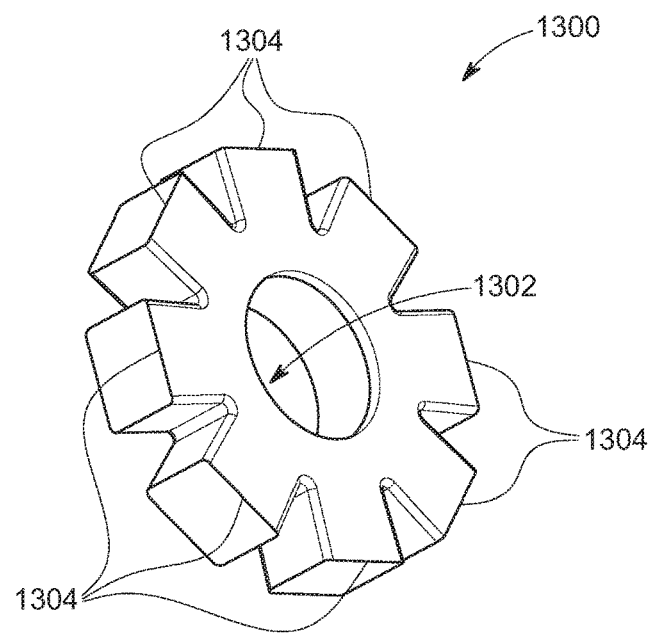
FIG. 13 is a view of a connecting member for a connecting system for lighting members, according to a fourth embodiment.
Figure 14:
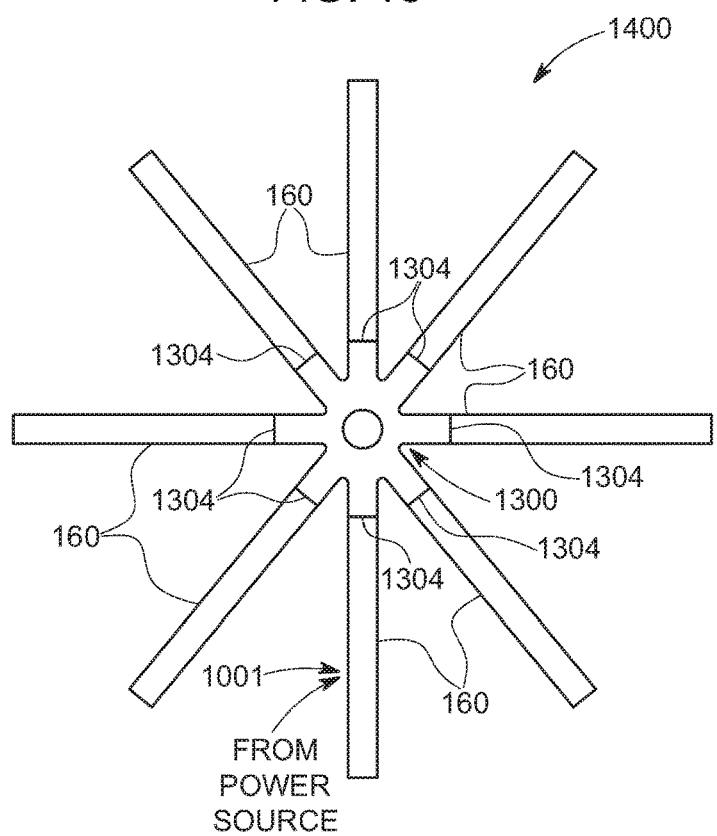
FIG. 14 is a view of a plurality of lighting members, according to the fourth embodiment.

FIGS. 13 and 14 depict a connecting member 1300 for up to eight LED strip assemblies 160. FIG. 13 shows a connecting member 1300 that is in the shape of a star, with a *nexus* that can be a central axial through hole 1302 and eight radially arranged connection ports 1304 around the *nexus*. Each port 1304 can be constructed with electrical connections for engagement of an end of an LED strip assembly (not shown herein). It is contemplated that a mounting device can be built into the reverse side of the connecting member 1300 for engagement with a mounting stand (for example, a tripod), or that can be engaged with the central hole 1302. In further embodiments, connecting members can be constructed with two, three, fourth, five, six or more connection ports.

FIG. 14 shows a lighting array 1400 with eight LED strip assemblies 160 engaged with a connecting member 1300. It is contemplated that fewer strips can be engaged in the connecting member, either in proximity to each other, or evenly dispersed (for example, five LED strip assemblies in the top, bottom, and three right side ports, or four LED strip assemblies arranged in a "plus" sign). A plurality of lighting arrays 1400 can replace a series of larger lighting elements. In another embodiment, the connection ports 1304 are constructed with articulated mechanisms, allowing for the connected LED strip assemblies to be moved inwards or outwards, relative to the central hole 1302. A power cable can be attached to a power receptacle on one of the power strips 160. Each LED strip assembly 160 is electrically connected to the others through their connections with the connecting member 1300.

Figure 15:
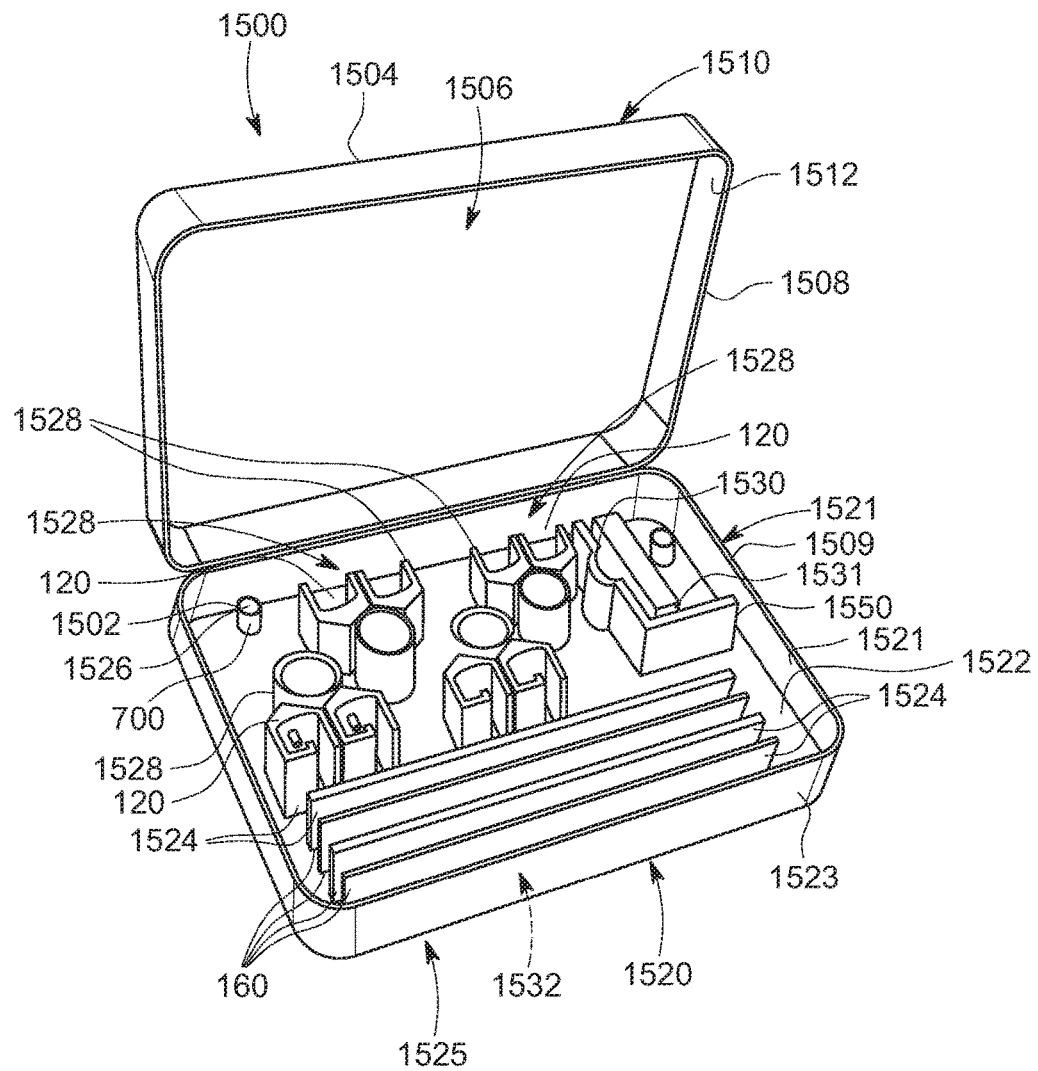
FIG. 15 is a view of a carrying case for the connecting system for lighting members.

A carrying case 1500 for transporting at least one of a connecting system for lighting members is shown in FIG. 15. The exemplary case is depicted as accommodating four LED strip assemblies 160 and four hinge assemblies 120. It is contemplated that in other embodiments, there can be more and/or less slots than depicted, to provide a more compact case for fewer components (for example, a single connecting system) or a larger dimensioned case for more components (for example, eight hinge assemblies and eight LED strip assemblies) than depicted herein. Moreover, the relative disposition of the components can be varied to other than the orientation as depicted, with the LED strip assemblies laterally disposed along the front of the case and the hinge assemblies to the rear.

The carrying case 1500 is constructed with a rigid exterior shell case that can be composed of a metal (for example, aluminum, a composite or steel), a rigid polymer (for example, molded polyurethane), hardwood or plywood, or a composite thereof. The carrying case is for retaining, storage of and transporting a connecting system for lighting members in a disassembled state and can be comprised of an openable rigid exterior shell case with an upper portion that includes a removable piece of high density foam material for padding, a lower portion that includes a removable piece of high density foam with a plurality of cutout compartments for holding each of a component of a disassembled connecting system for lighting members, a hinge assembly, a handle and a latch device for closure of the carrying case.

The case 1500 has an upper portion 1510 and a lower portion 1520. The upper portion 1510 and the lower portion 1520 can be connected by a hinge 1502 that permits an opening and closure of the case 1500. The case 1500 can be opened by raising the upper portion 1510 relative to the lower portion 1520, and can be closed by lowering the upper portion 1510 onto the lower portion 1520, until they make contact. It is contemplated that the case 1500 can be provided with at least one latch to secure the closure of the case, and at least one handle for carrying. With regard to the upper portion 1510, the exterior 1504 can be a hard shell. The interior 1506 can be provided with a removable segment of high density foam padding 1512 to cushion and protect the carried components from damage resulting from droppage, impacts or other accidents. An optional sealing structure 1532 can be provided along a rim 1508 of the upper portion 1510 and a rim 1509 of the lower portion 1520 that can engage and thereby create a waterproof seal (for example, a molded rubber strip).

The lower portion 1520 can be constructed to retain the carried components. The interior 1521 of the hard outer shell 1522 can be provided with a removable segment of high density foam padding 1523 to segregate and cushion the components and protect the carried components from damage resulting from droppage, impacts or other accidents. In an embodiment, four LED strip assemblies 160 can be laterally arranged in individual slots 1524 along the front side 1525 of the case. A dimmer knob 700 can be placed within a corresponding slot 1526. A plurality of hinge assemblies 120 can be stored within corresponding hinge slots 1528. A compartment 1530 for accessories can be provided and is depicted as having a hinged openable slot cover 1531. The accessory slot provides a space within the case for storage of smaller items, accessories, cables, et cetera. It is expressly contemplated that other arrangements can have more than one accessory compartment (for example, two). There can be two supplemental slots 1550, 1552 that can be used for storing other related accessories (for example, battery power supplies) and/or cables. It is contemplated that other supplemental slots can be constructed.

FIGS. 16A through 16G describes a system of connecting lighting members wherein a first section is a master section with an internal circuit board (not shown) and a dimmer that can be manipulated to increase or decrease the total illumination for the lighting members in an array. The "master" section controls the intensity of the illumination for the entire array and switches the power on and off. The remaining connected sections in the array do not have a dimmer switch or an on/off switch. With respect to FIG. 16A, an illustrative master section 1600 includes a first end 1602, a second end 1604, and an elongated body housing 1606 with an array of LEDs under a translucent cover 1608. A portion of a front side 1609 includes an on/off switch 1610 that operates the master section and all connected lighting members in the array. The master section 1600 is a lighting member. A dimmer switch 1612 is located in proximity to the on/off switch 1610 and likewise controls the master section and all connected lighting members in the array. The LED array is comprised of 77 LEDs, as set forth above. The dimensions of the master section are identical to the sections as set forth above.

Figure 16A:
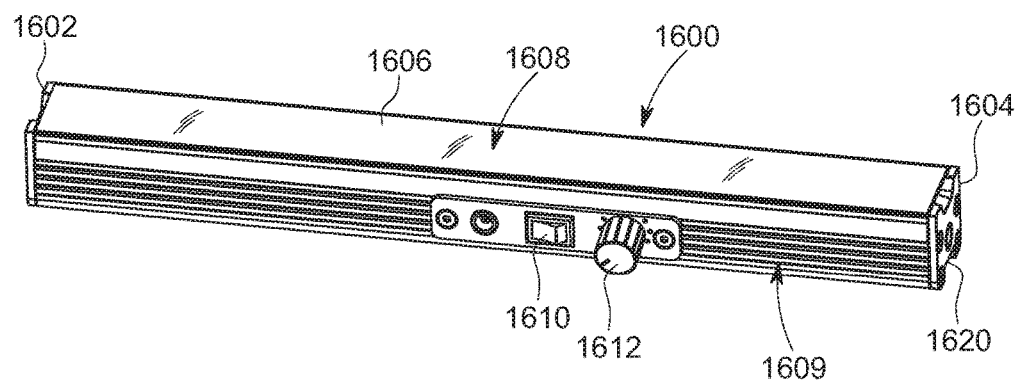
FIG. 16A is a perspective view of a master member of a connecting system for lighting members, according to a fifth embodiment.
Figure 16B:
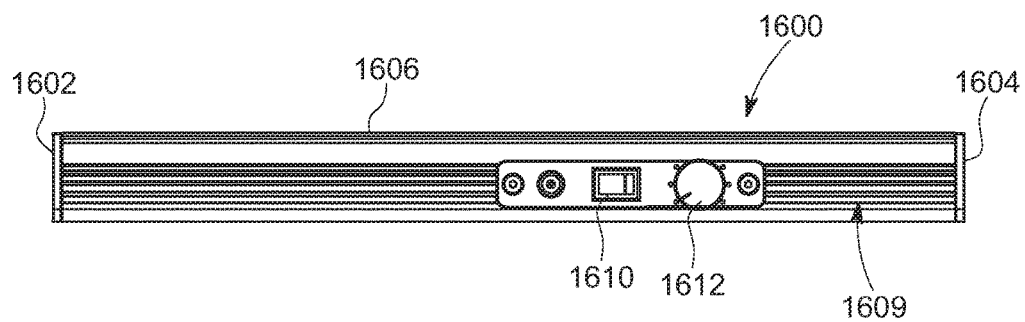
FIG. 16B is a front view of the master member of a connecting system for lighting members, according to the fifth embodiment.

FIG. 16B is a front view showing the front side 1609.

Figure 16C:
FIG. 16C is a rear view of the master member of a connecting system for lighting members, according to the fifth embodiment.

FIG. 16C is a rear view of the master section 1600.

FIG. 16D shows the first end 1602 of the master section 1600 with a mounting groove 1620 located on the bottom of the section.

FIG. 16E shows the second end 1604 of the master section 1600 with a mounting groove 1620 located on the bottom of the section.

In FIG. 16F, an LED array is situated beneath the translucent cover 1608, in a disposition as set forth above. In the illustrative embodiment, the translucent cover 1608 extends from the first end 1602 to the second end 1604. In another embodiment, the LED array can have more or less than 77 LEDs and the dimensions can be proportionally greater or lesser. The translucent cover 1608 can be shorter than depicted, and extend from an offset distance from either the first and second ends, such that it does not extend the full distance between the ends.

FIG. 16G shows the bottom with connecting groove 1620 running from the first end 1602 to the second end 1604.

FIGS. 17A to 17G describes a rotary hinge assembly 1700 wherein the electrical connectors 1720 are each constructed as a flat connector, in the manner of a Universal Serial Bus (USB), such that each includes one of more endpoints connected to electrical pipes arranged side by side. With respect to FIG. 17A, the illustrative rotary hinge assembly 1700 includes a rotary hinge joint 1702 that is both physically and electronically connected to an upper hinge assembly 1704 and a lower hinge assembly 1706. The functions of rotary hinge assembly 1700 are similar to the rotary hinge as described above. A first receptacle 1710 is part of a lower hinge assembly 1706 in an illustrative embodiment. A second receptacle 1712 is part of a upper hinge assembly 1704 in an illustrative embodiment. In a further embodiment, the first receptacle can be part of the upper hinge assembly. The first receptacle includes a back wall 1711 with an electrical connector 1720 that can connect with a section, for example, the master section 1600, at a USB-type receptacle connecting port 1722 situated in the first and second ends of the section (See FIGS. 16D-16E). The rotary hinge assembly further includes three locking knobs 1730, 1732 and 1734 that are threaded knobs that can be manipulated to lock and unlock the hinge or individual connected lighting members, as set forth above. Locking knob 1730 is included in the lower hinge assembly 1706 and locks and unlocks a lighting member to the first receptacle 1710. Locking knob 1732 is included in the upper hinge assembly 1704 and locks and unlocks a lighting member to the second receptacle 1712. Locking knob 1734 locks and unlocks the rotary hinge 1702.

Figure 17A:
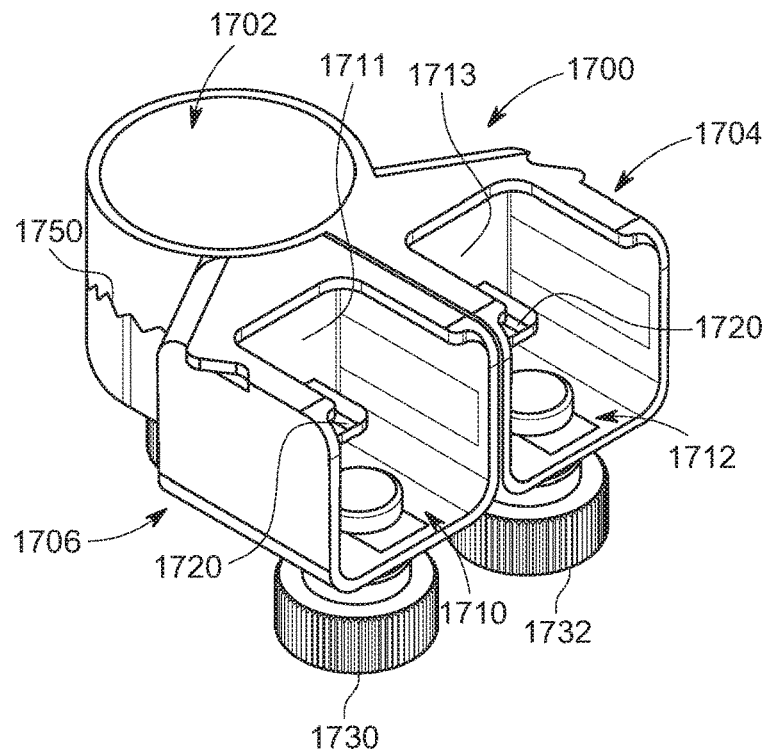
FIG. 17A is a perspective view of a rotary hinge assembly for a connecting system for lighting members, according to a sixth embodiment.
Figure 17B:
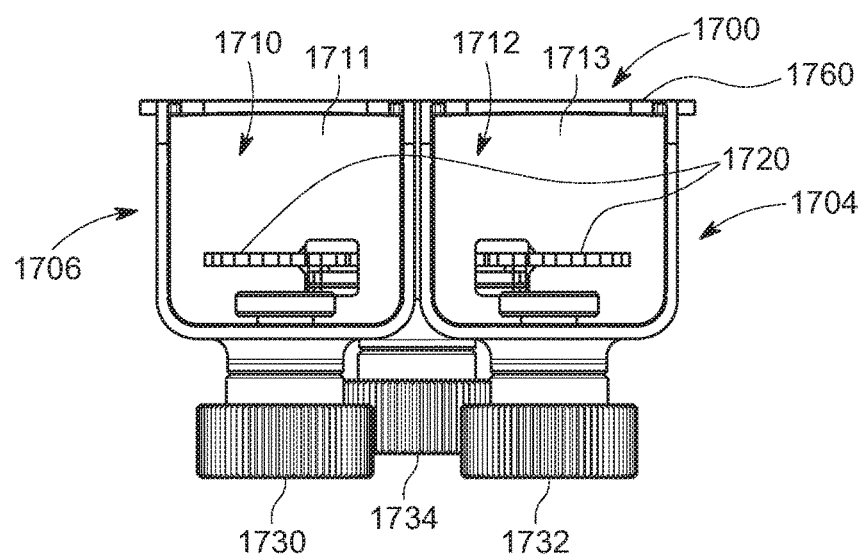
FIG. 17B is a front view of the rotary hinge assembly for a connecting system for lighting members, according to the sixth embodiment.

FIG. 17B is a view showing the placement of the electrical connectors 1720 within the first receptacle 1710 and the second receptacle 1712.

Figure 17C:
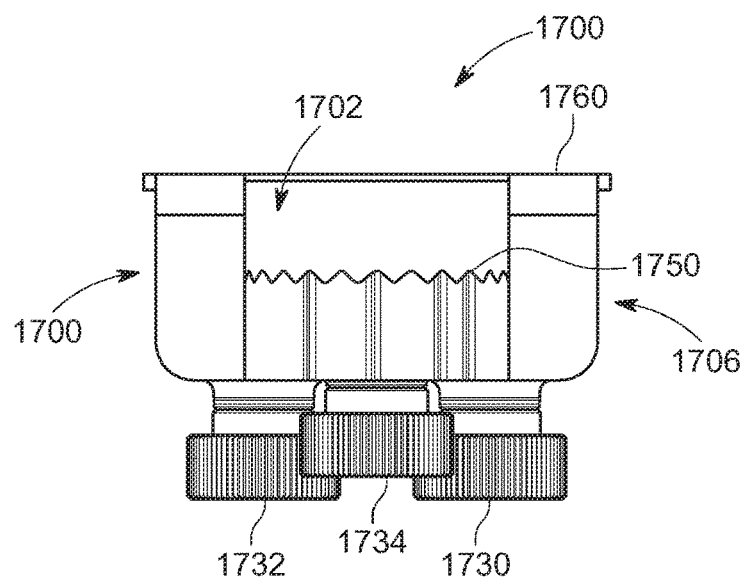
FIG. 17C is a rear view of the rotary hinge assembly for a connecting system for lighting members, according to the sixth embodiment.

FIG. 17C is a rear view showing the interface 1750 of the upper hinge assembly 1704 and the lower hinge assembly 1706.

Figure 17D:
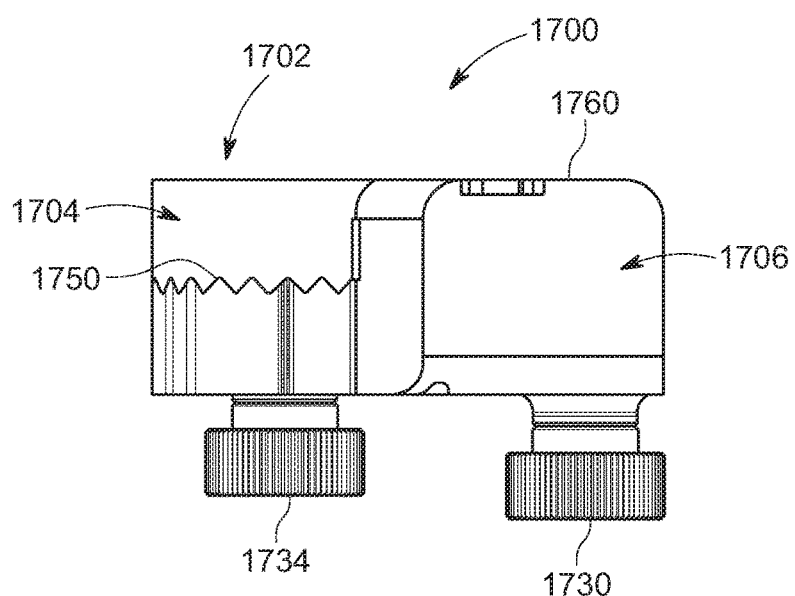
FIG. 17D is a left side view of the rotary hinge assembly for a connecting system for lighting members, according to the sixth embodiment.
Figure 17E:
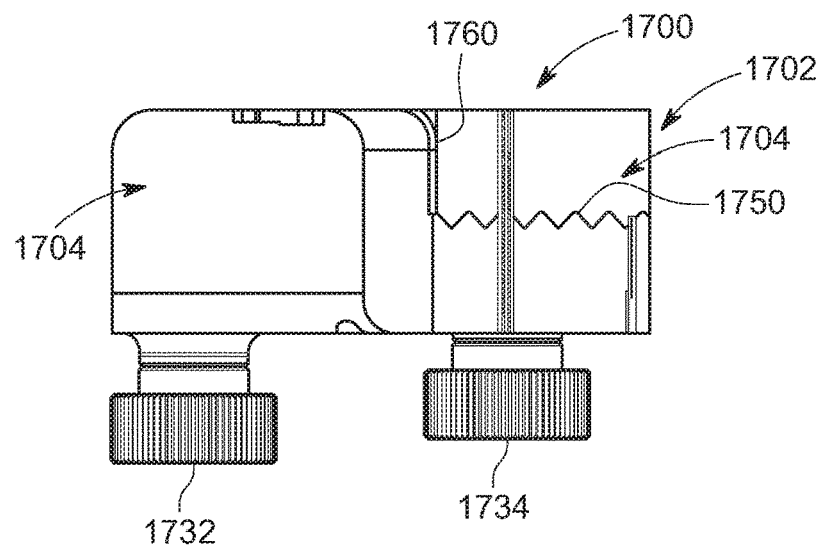
FIG. 17E is a right side view of the rotary hinge assembly for a connecting system for lighting members, according to the sixth embodiment.

FIG. 17D is a left side view of the rotary hinge assembly 1700 and FIG. 17E is a right side view of that rotary hinge assembly. The connecting members 1720 in each of the receptacles 1710, 1712 are situated such that an inserted connecting light member will connect with the connecting member 1720 in the respective connecting port 1722 and the translucent top surface of each connecting member will align with the top surface 1760 of the rotary hinge assembly so as to avoid undesirable shadows being cast and a more complete illumination effect.

Figure 17F:
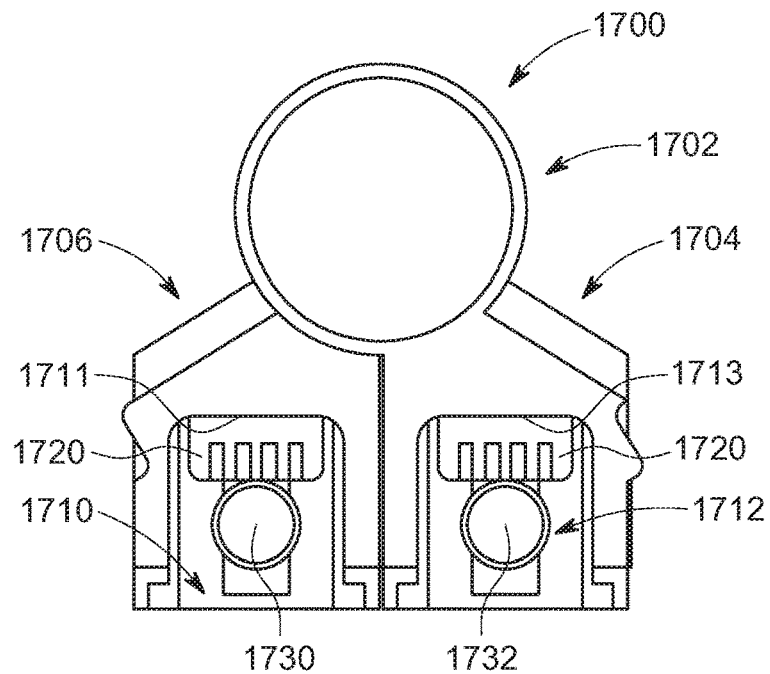
FIG. 17F is a top view of the rotary hinge assembly for a connecting system for lighting members, according to the sixth embodiment.

FIG. 17F is a top view of a rotary hinge assembly 1700, showing the alignment of the connecting members 1720.

Figure 17G:
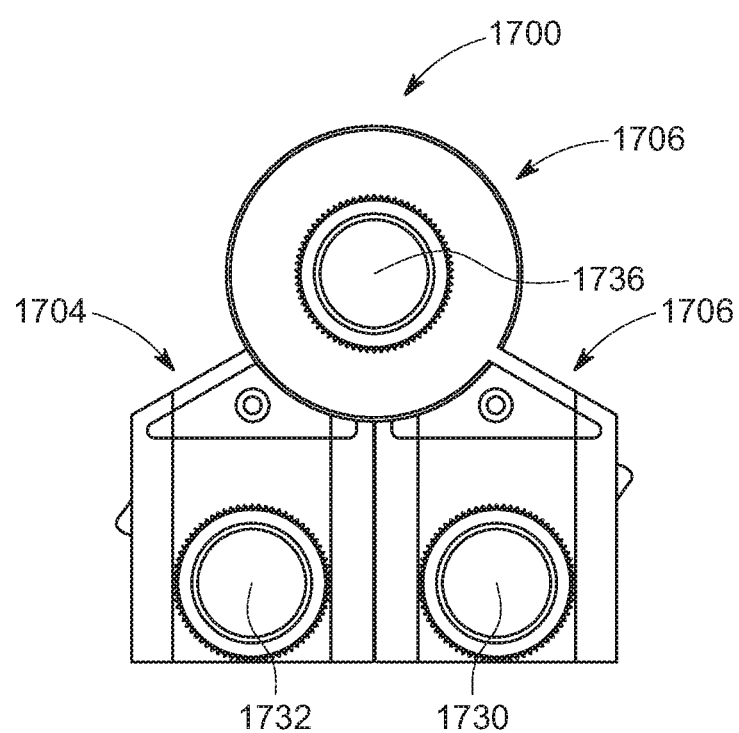
FIG. 17G is the bottom view of a rotary hinge assembly for a connecting system for lighting members, according to the sixth embodiment.

In FIG. 17G, the alignment of locking knobs 1730, 1732 and 1734 is shown.

Figure 18:
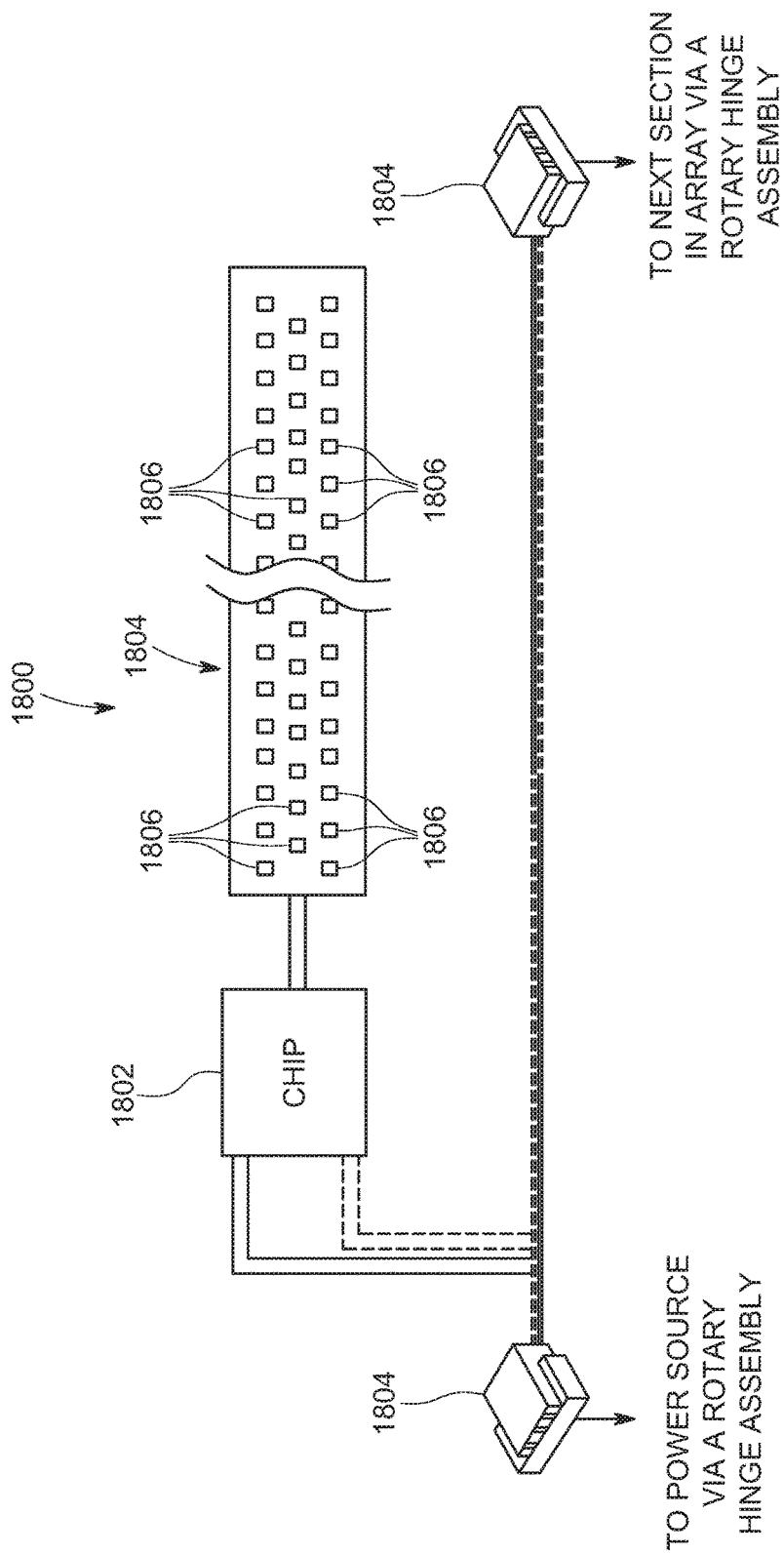
FIG. 18 is a schematic view of a wiring harness for a section of a connecting system for lighting members, according to the sixth embodiment.

FIG. 18 depicts a schematic view of a wiring harness 1800 for a section of the connecting system for lighting members. A sequence of lighting members includes a master lighting member that includes an on/off switch and a dimmer that are connector to a circuit board chip. Each of the connecting members includes a circuit board chip 1802 ("chip") that is in connection with both electrical end connectors 1804 and a LED array panel 1804. In an embodiment, the LED array panel 1804 is provided with 77 LEDs 1806. The wiring harness of the master section is similar to wiring harness 1800, but further includes a dimmer. The wiring harness can include four wires, two of which are for control and two of which are for power.

Figure 19:
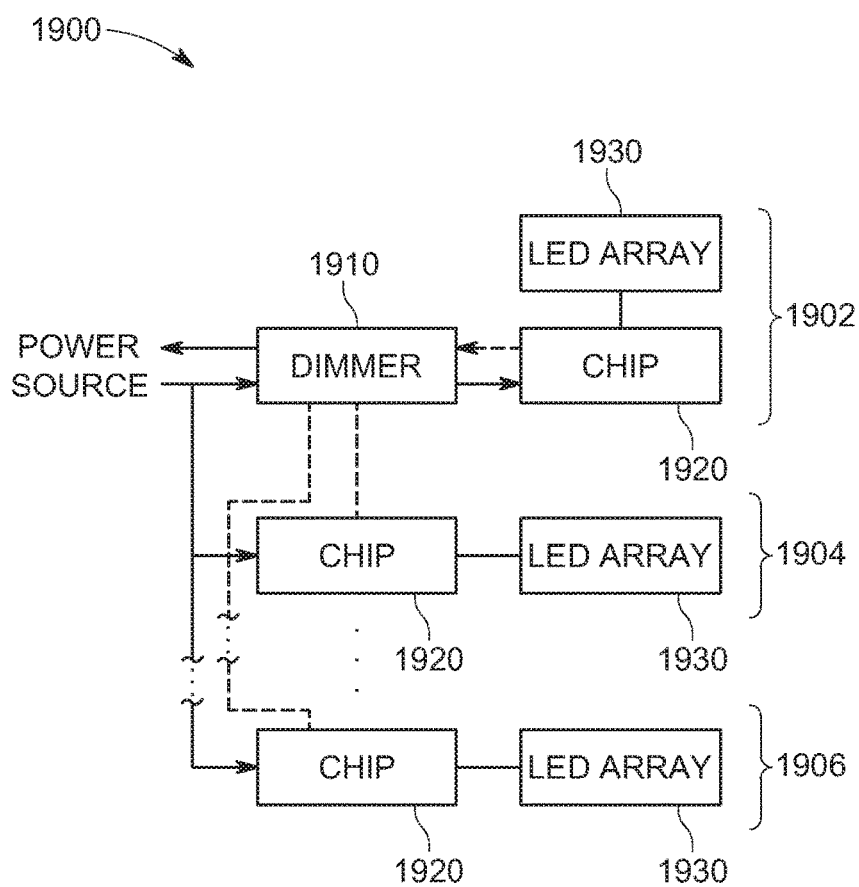
FIG. 19 is a schematic view of the wiring harness for a section of an array of connecting system for lighting members, according to a sixth embodiment.

FIG. 19 shows a wiring harness array 1900 that includes a master section 1902 and more than one "regular sections" 1904, 1906. The regular sections include a chip and a LED array, but do not have an on/off switch and a dimmer, and are therefore subservient to the master section instructions as to switching on and off, and intensity of illumination. It is contemplated that up to eight connecting light members can be linked together to create an array. In an embodiment, the master section 1902 is connected to a power source and includes a dimmer 1910, a chip 1920 and a LED array 1930. The regular sections 1904 and 1906 include each of a chip 1920 and a LED array 1930. The chip 1920 serves to receive and process input instructions and power from the master section 1902 and to disperse power to each of the LEDs. It is contemplated that the master section chip can include a receiver for the reception of wireless instructions from a transmitter in a camera to switch on and off for flash effects. It is further contemplated that such instructions can include a strobe effect.

Figure 20:
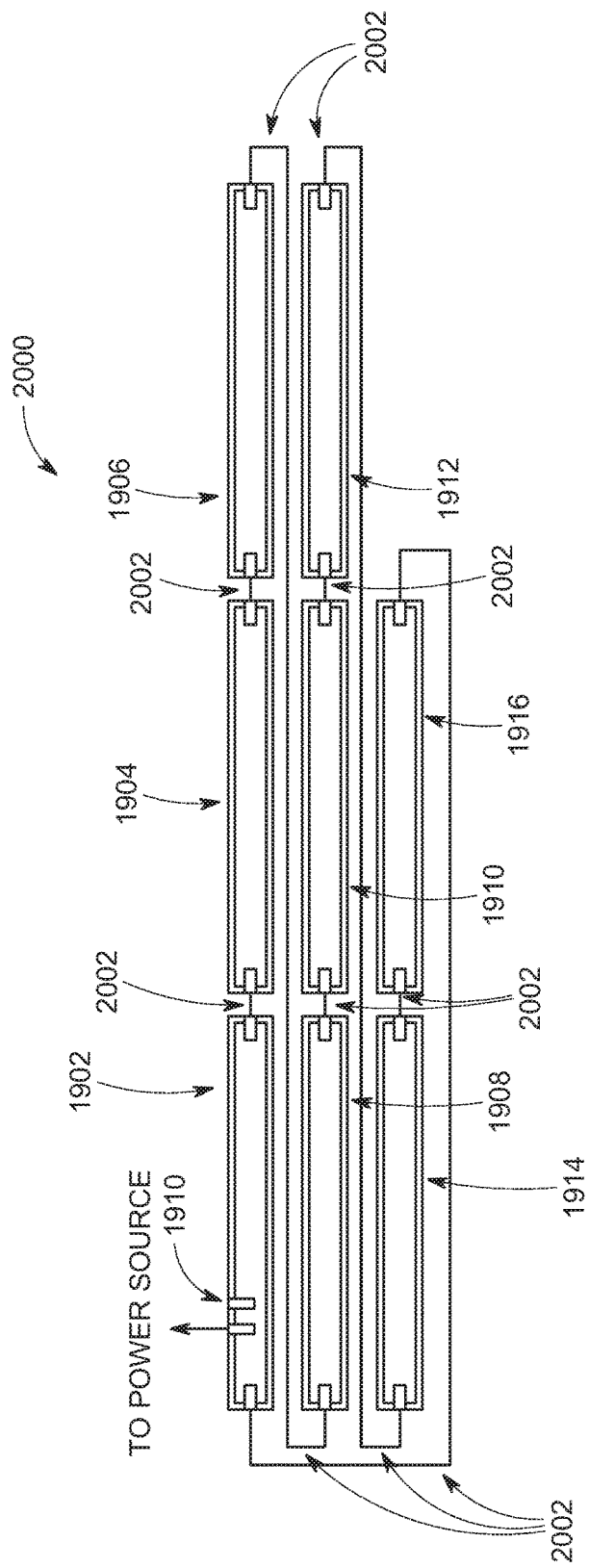
FIG. 20 is a schematic view of the wiring harness for a section of an array of eight sections of a connecting system for lighting members, according to the embodiment.

FIG. 20 is a further view of the harness of FIG. 19, showing a serial array 2000 of eight interconnected lighting members, linked by rotary hinge assemblies (not shown) that include interconnected wiring linkages 2002. The array as described includes, in sequence, sections 1902, 1904, 1906, 1908, 1910, 1912, 1914, 1916 with 1916 connected to sections 1902. A master section 1902 is connected to regular sections 1916 and 1904. Section 1904 is connected to the master section 1902 and section 1906. Section 1906 is connected to sections 1904 and 1908. Section 1908 is connected to sections 1906 and 1910. Section 1910 is connected to sections 1908 and 1912. Section 1912 is connected to sections 1910 and 1914. Section 1914 is connected to sections 1912 and 1916. Section 1916 is connected to section 1914 and master section 1902.

It should be obvious that the above described invention provides a simple, readily portable and highly variable system for a creating a wide variety of lighting effects. A plurality of LED strip assemblies can be connected to one another by rotary hinges and formed into numerous integrated shapes for producing desired effects without additional implements, mounting stands or a miscellany of power cords. The interconnectivity of power ports with engaged elements provides a readily controllable and user friendly system for creating refined lighting effects.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, the system described above can be used for still photography or motion picture filming. The above-described system can also be employed to create virtual films for viewing in association with virtual reality systems. It is contemplated that a master control unit can be attached to an array of elements as described above, to synchronize the use of the array with other accessories (for example, a multiple strobe array or an image projector of some type). The system can be used for permanent or temporary artistic displays or as lighting for dramatic presentations. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Accordingly, this description is meant to be taken only by way of example, and not to otherwise limit the scope of this invention.

What is claimed is:

1. A connecting system for lighting members comprising:
a plurality of LED strip assemblies comprising at least a first LED strip assembly and a second LED strip assembly; and
at least one rotary hinge assembly comprising an internal electrical connection, the rotary hinge assembly comprising:
an upper hinge portion comprising an upper receptacle for receiving a first end of the first LED strip assembly, the upper hinge portion further comprising a first receptacle electrical connection for connecting with a first LED strip electrical connection on the first end of the first LED strip assembly;
a lower hinge portion comprising a lower receptacle for receiving a first end of the second LED strip assembly, the lower hinge portion further comprising a second receptacle electrical connection for connecting with a second LED strip electrical connection on the first end of the second LED strip assembly; and
a central axial connection element residing within an axial channel defined in part by the upper hinge portion and the lower hinge portion.

2. The connecting system for lighting members of claim 1, wherein the first LED strip electrical connection on the first LED strip assembly and the second LED strip electrical connection on the second LED strip assembly are a female electrical connection ports.

3. The connecting system for lighting members of claim 2, wherein the first receptacle electrical connection on the upper hinge portion and the second receptacle electrical connection on the lower hinge portion are male electrical connections.

4. The connecting system for lighting members of claim 1, wherein the first LED strip assembly further comprises a third electrical connection on a second end of the first LED strip assembly.

5. The connecting system for lighting members of claim 1, wherein the first LED strip assembly further comprises an input electrical connection on a side of the first LED strip assembly, thereby allowing the connecting system for lighting members to receive power from an external power source.

6. The connecting system for lighting members of claim 1, wherein the first LED strip assembly further comprises an accessory electrical connection on a side of the first LED strip assembly, wherein the accessory electrical connection is constructed and arranged to provide power from the connecting system for lighting members to an external accessory.

7. The connecting system for lighting members of claim 1, wherein the rotary hinge assembly further comprises an input electrical connection, thereby allowing the connecting system for lighting members to receive power from an external power source.

8. The connecting system for lighting members of claim 1, wherein the first LED strip assembly further comprises a switch for selectively turning the first LED strip assembly on and off.

9. The connecting system for lighting members of claim 1, wherein the first LED strip assembly further comprises a switch for selectively turning the connecting system for lighting members on and off.

10. The connecting system for lighting members of claim 1, wherein the first LED strip assembly further comprises a control chip.

11. The connecting system for lighting members of claim 1, wherein the upper hinge portion is provided with teeth and the lower hinge portion is provided with teeth so that the teeth of the upper hinge portion can removably engage the teeth of the lower hinge portion and thereby create a strong, precisely aligned connection between the upper hinge portion and the lower hinge portion.

12. A connecting system for lighting members of claim 1, wherein the first and second LED strip assemblies include a master lighting member having an on/off switch and a dimmer that are connected to a circuit board chip.

13. The connecting system for lighting members of claim 12, wherein the dimmer controls the intensity of illumination for the master lighting member and all connected lighting members.

14. The connecting system for lighting members of claim 13, wherein the first and second receptacle electrical connections are USB-type connectors.

* * * * *